United States Patent [19]
Depatie et al.

[11] Patent Number: 6,017,156
[45] Date of Patent: Jan. 25, 2000

[54] APERTURE/SHUTTER SYSTEM AND A STEPPER MOTOR FOR USE THEREIN

[75] Inventors: Jean F. Depatie, Albion; Teresa C. Mayer, Rochester; Robert A. Bovenzi, Rochester; Martin P. Farcella, Rochester, all of N.Y.

[73] Assignee: Eastman Kodak Company, Rochester, N.Y.

[21] Appl. No.: 09/207,737

[22] Filed: Dec. 8, 1998

[51] Int. Cl.[7] .............................. G03B 9/08; H02K 1/27; H02K 5/00; H02K 21/12
[52] U.S. Cl. .............................. 396/463; 310/89; 310/91; 310/156; 310/261
[58] Field of Search ........................ 396/505, 508, 396/463; 310/156, 91, 89, 270, 261, 266

[56] References Cited

U.S. PATENT DOCUMENTS

| 4,005,448 | 1/1977 | Iwata et al. .............................. 396/244 |
|---|---|---|
| 4,534,624 | 8/1985 | Toda et al. .............................. 359/696 |
| 4,596,449 | 6/1986 | Iwata et al. .............................. 359/696 |
| 4,693,580 | 9/1987 | Hanamori et al. .................. 396/505 X |
| 4,695,144 | 9/1987 | Yoshino et al. .......................... 396/139 |
| 4,828,360 | 5/1989 | Maruyama .............................. 359/824 |
| 5,747,897 | 5/1998 | Iwasa et al. .......................... 310/49 R |
| 5,790,903 | 8/1998 | Iwasaki et al. ............................. 396/80 |

Primary Examiner—W. B. Perkey
Attorney, Agent, or Firm—Svetlana Z. Short

[57] ABSTRACT

An aperture/shutter system defining an optical path comprises a shutter mechanism operable at a first state to selectively block light along the optical path and a second state to allow light along the optical path; and a motor including a stator and an annular rotor. The rotor is rotably supported within the stator by a support that is (i) stationary with respect to the stator and (ii) engages an inner surface of the rotor. The rotor is coupled to the shutter mechanism to move the shutter mechanism between the first state and the second state.

32 Claims, 11 Drawing Sheets

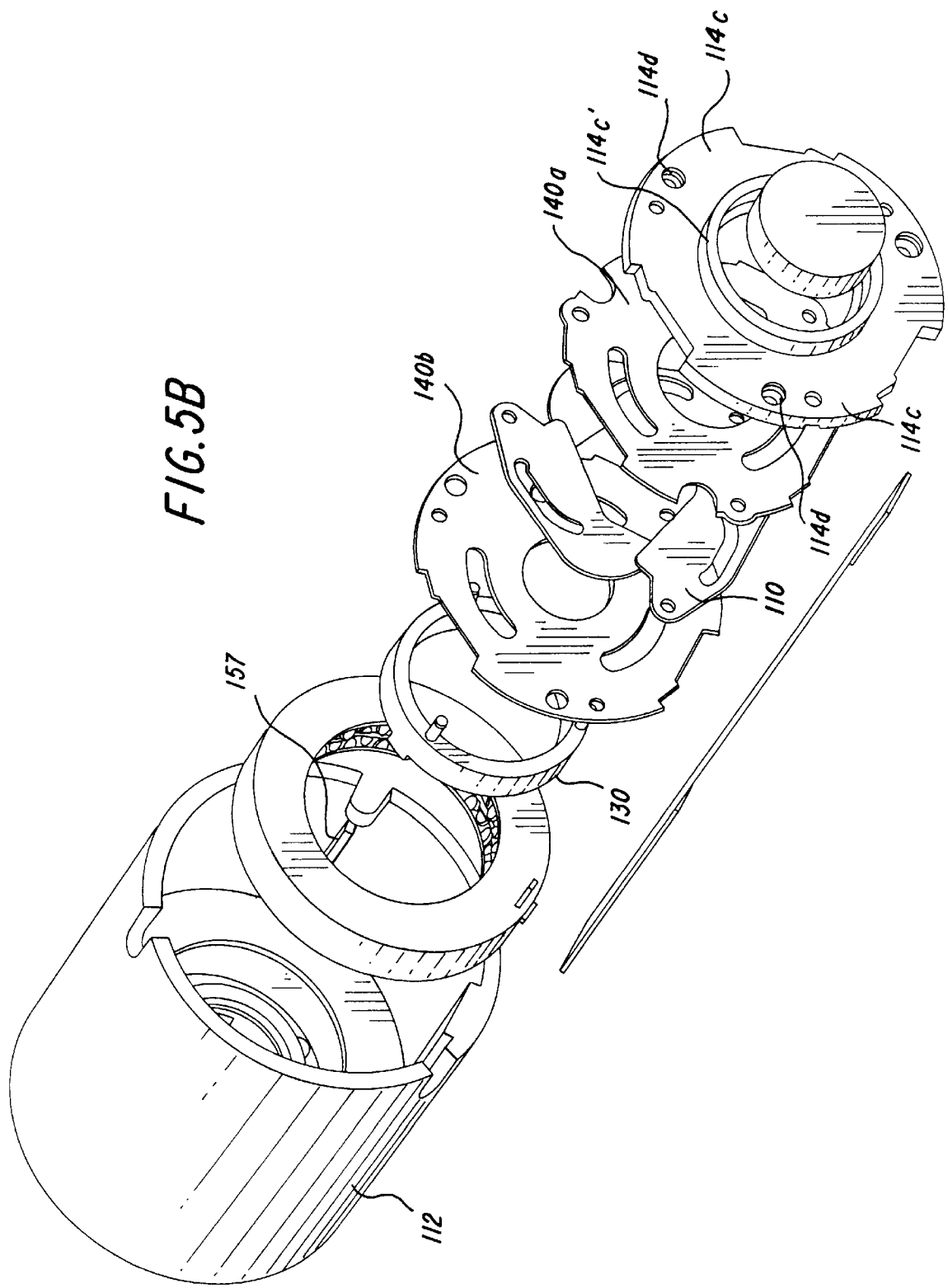

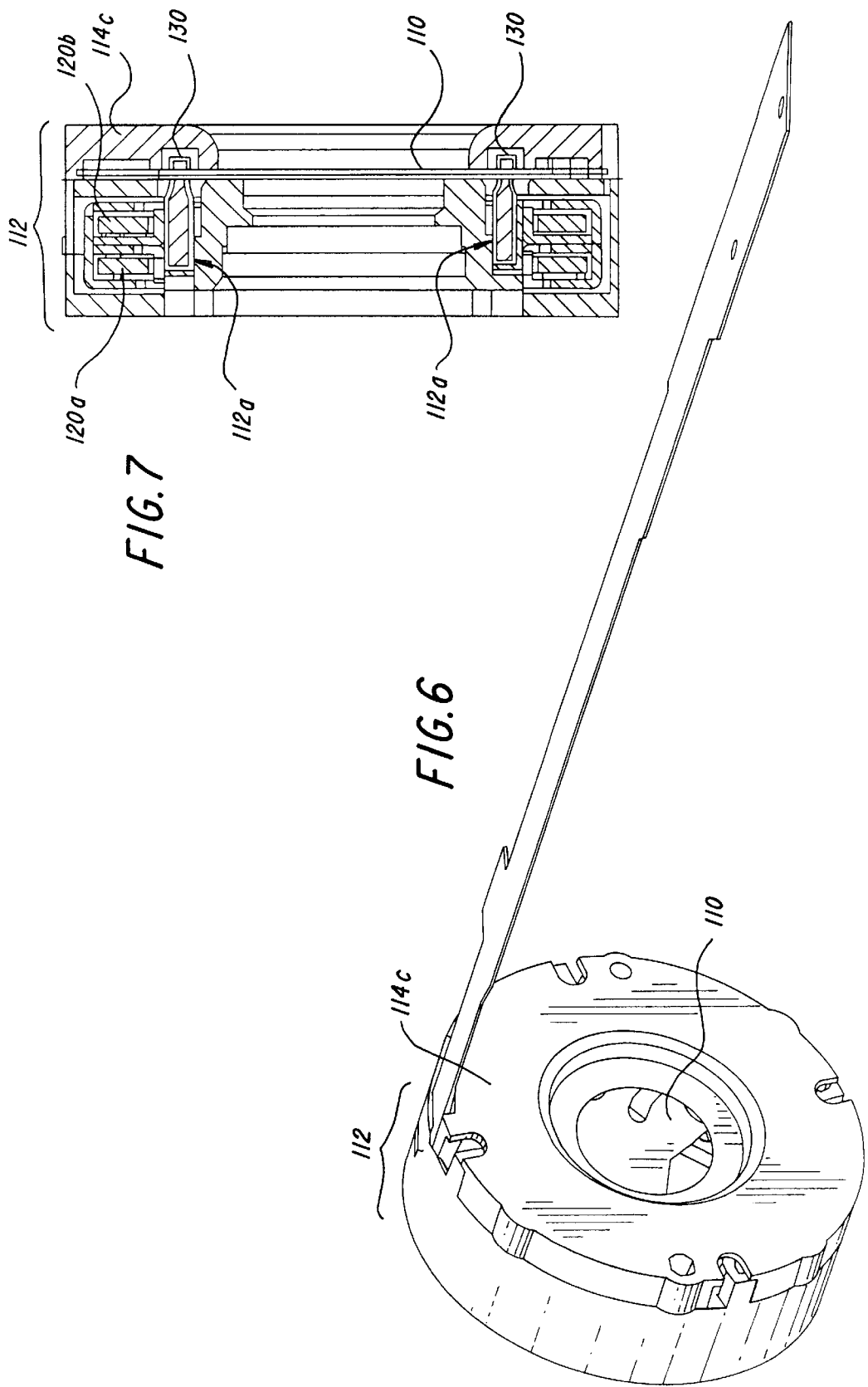

APERTURE/SHUTTER SYSTEM AND A STEPPER MOTOR FOR USE THEREIN

CROSS REFERENCE TO RELATED APPLICATIONS

This application is related to the following applications filed concurrently herewith: "Aperture/Shutter System with A Motor Component" by Jean F. Depatie, et al (Attorney Docket No. 78421/SZS); and "An Imaging Apparatus with A Motor Component" by Jean F. Depatie, et al (Attorney Docket No. 78728/SZS).

FIELD OF THE INVENTION

The present invention relates in general to a motorized aperture and/or shutter system for use in photographic cameras and to small stepper motors suitable for use in such systems.

BACKGROUND OF THE INVENTION

A typical photographic camera includes a lens barrel assembly comprising at least one barrel supporting one or more lens elements and a shutter assembly. Such a shutter assembly 5 is illustrated in FIG. 1. The shutter assembly 5 includes a ring 20 and several blades 10a, 10b, 10c that open by a variable amount to provide the desired aperture for the proper exposure. The shutter assembly is enclosed by the two housing parts 18A and 18B. The movement of the blades is controlled by a pinion gear 22 of a stepper motor 24 via use of the ring 20. The motor 24 and the pinion gear 22 are located external with respect to the shutter assembly. The ring 20 includes a sector gear with a plurality of gear teeth 20b that engages the teeth of the pinion gear 22. Thus, when the rotor 24a of the stepper motor 24 rotates, the pinion gear 22 attached to the stepper motor 24 also rotates, rotating the ring 20. The ring 20 includes posts 20a which are coupled to the slots 10a', 10b', 10c' in each of the blades 10a, 10b, 10c. The rotation of the ring 20 moves the blades, changing the size of the aperture. The blades 10a, 10b, 10c are moved in a series of steps from the closed position to achieve the desired aperture size, stay in this position for the desired exposure time and then reverse into the closed position. This configuration results in multiple parts, complex assembly and the expense due to precision alignment of the stepper motor to the shutter assembly, and the alignment of the gear teeth of the pinion gear to the poles of the stepper motor 24.

In addition, the shutter assembly is a separate part from the lens barrel assembly. Thus, the shutter assembly and the lens barrel assembly need to be precision aligned with respect to one another. This type of alignment is difficult, expensive and produces an incorrect exposure if the alignment is not performed properly. Finally, this configuration results in a large package size.

U.S. Pat. No. 4,005,448 discloses a programmable shutter and uses a stepper motor to control its position. The patent describes construction of the stepper motor for shutter actuator control and a control circuit for supplying the pulses to the stepper motor and aperture/shutter driver control circuit. More specifically, FIG. 4 of this patent illustrates that the motor comprises a stator and rotor with a central opening and, the shutter comprises three blades also forming an opening. The light passes through the central opening of the rotor and through the opening formed by the blades. This figure also shows that a ball bearing is used to maintain the proper positioning between the stator and the rotor. The proper gap between the rotor and stator is critical to allow for proper operation of the motor assembly. Thus, the stator, the ball bearing and the rotor have to be manufactured to high tolerances and carefully assembled with respect to one another. In addition, the rotation of the ball bearing has to overcome its rotational inertia, which requires power, and reduces the amount of torque generated by the motor and affects its uniformity. The assembly of many parts to form a motor in itself increases the motor size and motor complexity. Furthermore, the patent does not describe alignment between the lens barrels and the shutter assembly. As stated above, the precision alignment of the stepper motor to the shutter assembly and the precision alignment of the shutter assembly to the lens barrel assembly is expensive, and may result in an incorrect exposure if the alignment is not performed properly. Finally, the stepper motor and the shutter assembly disclosed in the U.S. Pat. No. 4,005,448 form different and separate parts from the lens barrel assembly. The shutter assembly still needs to be aligned to the lens barrel assembly. The alignment of the shutter assembly to the lens barrel has to be accomplished external to the shutter assembly. The patent does not disclose how this alignment is being done. In addition, the disclosed shutter assembly is large.

U.S. Pat. No. 4,596,449 describes a zoom drive mechanism for moving the lens units (also referred to as lens groups) to varying zoom positions and, therefore, for changing the focal length of the zoom lens system and for the fine focus adjustment. This zoom drive mechanism utilizes a stepper motor comprising a stator and a rotor. The stepper motor elements are mounted to the lens barrels. The rotation of the rotor moves the lens barrels. An improper assembly of the motor to the lens barrels can result in a wrong focal length and degraded image quality. This patent is silent with respect to the issue of aperture/shutter control.

SUMMARY OF THE INVENTION

It is an object of the present invention to provide an aperture/shutter system that overcomes the problems exhibited by the prior art. It is also the object of the present invention to provide an aperture/shutter system that is very compact, has a minimum number of mechanical parts and provides a highly uniform torque. It is also an object of the present invention to provide an aperture/shutter system which is rotationally symmetric about an optical axis, has a large central opening, and is easy to assemble.

According to one aspect of the present invention, an aperture/shutter system defining an optical path comprises a shutter mechanism operable at a first state to selectively block light along the optical path and a second state to allow light along the optical path; and a motor including a stator and an annular rotor. The rotor is rotably supported within the stator by a support that is (i) stationary with respect to the stator and (ii) engages an inner surface of the rotor. The rotor is coupled to the shutter mechanism to move the shutter mechanism between the first state and the second state.

According to another aspect of the present invention, a motor suitable for use in an aperture/shutter system comprises a stator and an annular rotor arranged inside the stator. The rotor has having an outer surface facing said stator and an inner surface and is rotably supported within the stator by a support that is stationary with respect to the stator. This support is adjacent to the inner surface of the rotor.

According to one embodiment of the present invention the motor also includes a housing encasing the stator. This housing includes a hub providing the support for the rotor and a lens seat supporting at least one lens element.

According to yet another aspect of the present invention an imaging system comprises: (i) a plurality of lens elements defining an optical axis; (ii) a shutter mechanism including a plurality of shutter blades; and (iii) a motor including a stator and an annular magnetic rotor arranged inside said stator. The rotor is rotably supported within the stator by a support that engages an inner surface of the rotor and is stationary with respect to the stator. The rotor is axially aligned with the stator along the optical axis. The stator in combination with the rotor causes rotation of the shutter blades.

The above, and other objects, advantages and novel features of the present invention will become more apparent from the accompanying detailed description thereof when considered in conjunction with the following drawings.

BRIEF DESCRIPTION OF THE DRAWINGS

FIG. 5B is an exploded view of a stepper motor housing, a stator that is being assembled into this housing, a rotor, shutter blades, separators and a cover that includes a lens set.

FIG. 6 is a perspective view of a stepper motor housing, stator, rotor, shutter and cover assembly.

FIG. 7 is a cross sectional view of the assembly of FIG. 6.

DETAILED DESCRIPTION OF THE INVENTION

The present description will be directed in particular to elements forming part of an apparatus in accordance with the present invention. It is understood that elements not specifically shown or described may take various forms well known to those skilled in the art.

Figure 2:
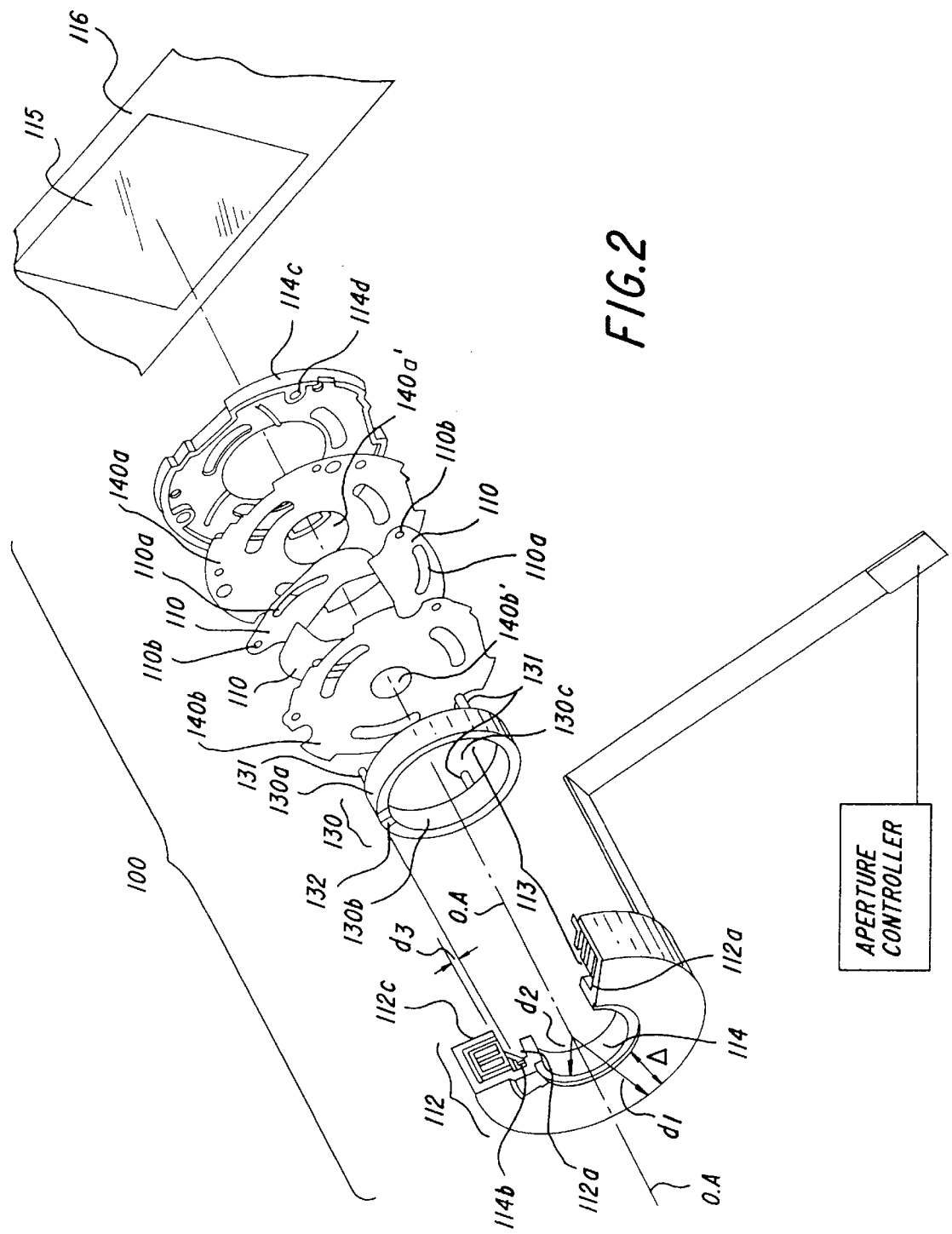
FIG. 2 is an exploded view of a directly coupled stepper motor aperture/shutter system of the first embodiment of the present invention.
Figure 3:
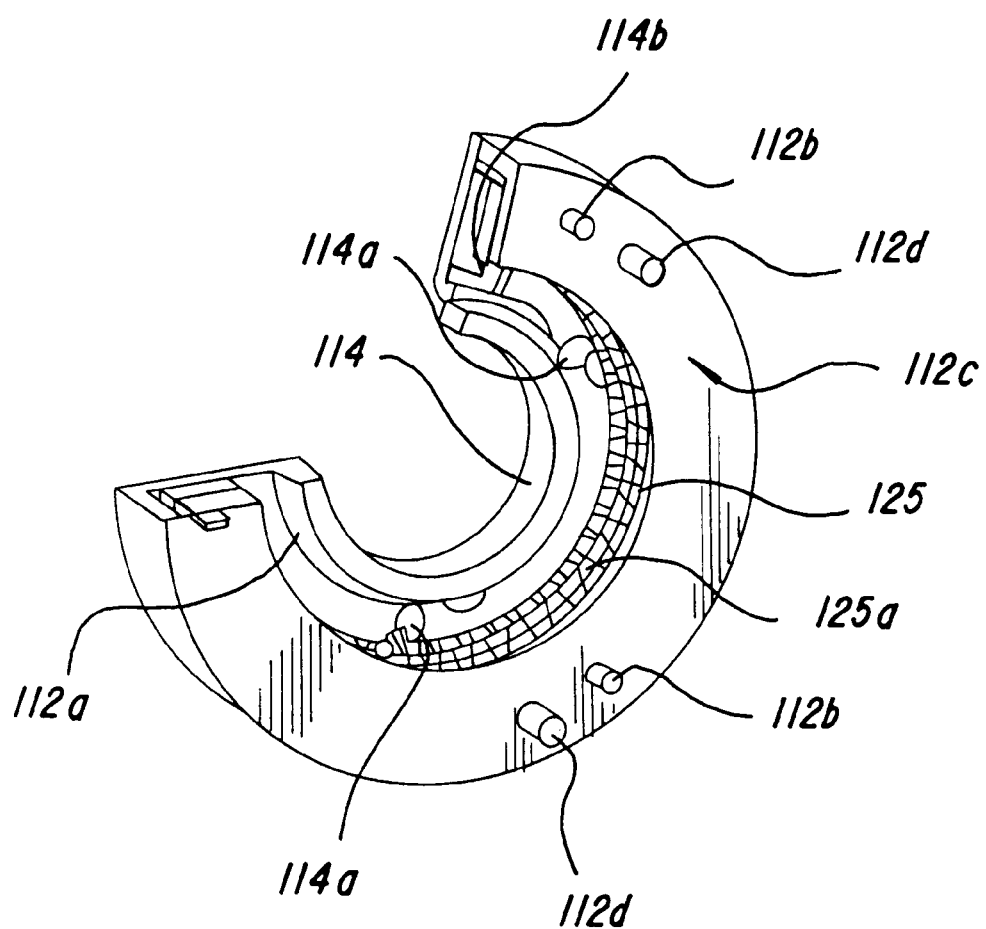
FIG. 3 is a perspective view of an integral stepper motor housing and a stator assembly.

FIG. 2 shows the aperture/shutter system of the first embodiment of the present invention. This aperture/shutter system has a plurality of blades that serve as a shutter and that form an aperture that limits the amount of light entering into an lens system (not shown) and, thus, the blades also serve as an aperture stop for the lens system. More specifically, in this embodiment an aperture/shutter system 100 comprises (i) a shutter with a plurality of blades 110, each including a slot 110a, and a hole 110b, (ii) a doughnut like aperture/shutter housing 112 with an internal central hub 112a and (iii) a stepper motor 113 at least partially enclosed by the housing 112. The housing 112 has at least one and preferably more posts 112b in its rear wall 112c (see FIG. 3) for engaging the holes 110b of the blades 110 and providing a pivot support for the blades 110. The blades 110 move, thereby providing a variable aperture opening. A more detailed description of the blades 110 is provided further in the specification. The inner wall 114 of the housing 112 forms a hollow cylinder for providing access to the light propagating along an optical path (through one or more of the lens elements that form the lens system) towards an imaging area 115 on a photosensitive media such as film 116, or an electronic light sensitive device, for example a CCD array (not shown). When one or more lens elements are placed into this hollow cylinder, the length of the lens system (along the optical axis) and the diameters of the lens elements are reduced, because the lens elements are located as close as possible to the aperture stop (formed by the blades 110). The housing 112 may also include hemispherical location pads 114a, a slot 114b and mounting features 112d for a cover 114c. This is illustrated in FIG. 3. The functions of the pads 114a and the slot 114b are described further in the specification.

Figure 4:
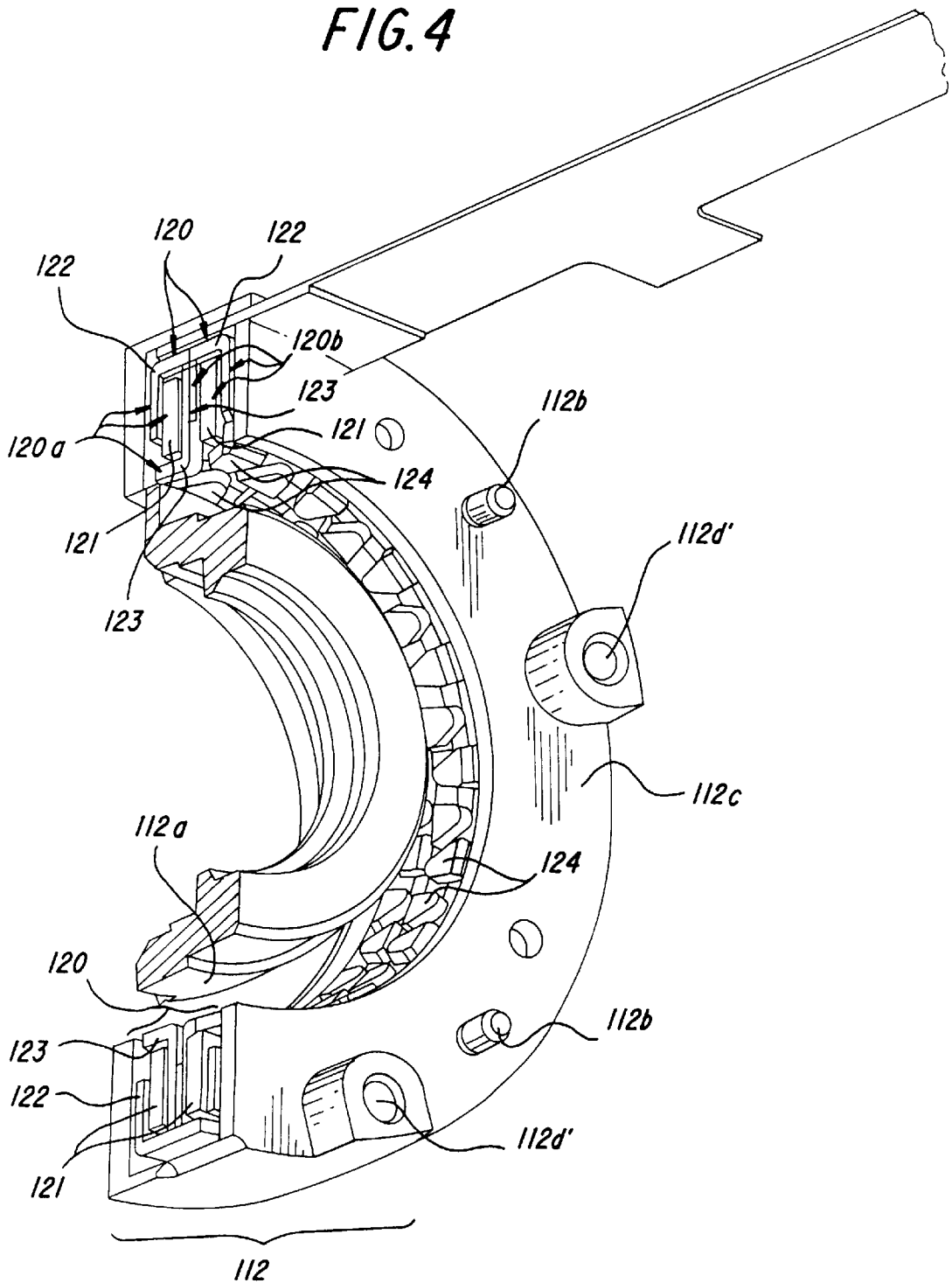
FIG. 4 is an enlarged view of an integral stepper motor housing and stator assembly.

Referring to FIG. 4, the stepper motor is a magnetic motor that comprises a stator 120 formed with two stator assemblies 120a, 120b. The two stator assemblies 120a, 120b each include a coil 121 of a tightly wound wire and two metal parts 122, 123 surrounding each of the coils 121. (FIG. 4) These metal parts 122, 123 include projections forming teeth 124 that interleave with one another at a close proximity to one another. The teeth 124 act as magnetic poles of the stator 120. More specifically four such interleaved teeth 124 form four poles of the stepper motor 113. The teeth 124 form an inner cylindrical wall 125 of the stator (see FIG. 3).

The stator assemblies 120a, 120b of the stepper motor 113 are located inside the aperture/shutter housing 112, are partially enclosed by this housing and, preferably form an integral part of the aperture/shutter housing 112, for example, by having the plastic aperture/shutter housing 112 molded, extruded, or cast around the stator 120. As used herein, the terms "integral" and "integrally" are defined as being made or formed as a single unit, for example, by casting or molding and does not mean that the pieces are assembled together after their manufacture. For example, in this embodiment, the aperture/shutter housing 112 is not made as a separate piece that is later attached to the stator 120.

More specifically, in this embodiment of the present invention the metal parts 122, 123 of the stator assemblies 120a, 120b are assembled together and are then encased into the plastic aperture/shutter housing 112 by injection molding the aperture/shutter housing 112 around the stator 120. During the injection molding process, locating pins positioned in the forming apparatus (i.e., a mold) used for injection molding hold the two stator assemblies 120a, 120b in a predetermined location, as the plastic aperture/shutter housing 112 is being molded around these stator assemblies 120a, 120b. Because the aperture/shutter housing 112 is molded around the stator assembly and is integral thereto, the stator 120 provides the required rigidity to the aperture/shutter housing and, the plastic walls of the aperture/shutter housing 112 are made very thin, without compromising the rigidity of the overall aperture/shutter housing 112. Because of this, the aperture/shutter housing 112 is very compact. More specifically, the axial length of the aperture/shutter system and the ratio of the outside diameter $d_1$ of the aperture/shutter housing 112 to its inner diameter $d_2$ (see FIG. 2) are very small because the stepper motor 113 is integrated into the aperture/shutter housing 112 and, because the entire aperture/shutter system is symmetrical (with respect to the optical axis defined by the lens elements centered about this axis). It is preferred that the outside diameter $d_1$ be small (for example, about 28 mm and more preferably 26 mm or less) and that the ratio of an outside diameter of $d_1$ to the inner diameter $d_2$ be $2.5<d_1/d_2<3.4$. It is most preferable that this ratio be $2.7<d_1/d_2<3.3$. For example, in one implementation, the outside diameter $d_1$ of the housing 112 of this embodiment is 25 mm and its inner diameter $d_2$ is 8.0 mm. Therefore, the ratio of an outside diameter of $d_1$ to the inner diameter is 3.18 and, thus, the annular size $\Delta=d_1-d_2$ of the aperture/shutter system is very small, i.e., $\Delta=d_1-d_2=8.5$ mm. In another implementation, the outside diameter $d_1$ of the housing 112 is 22 mm and the inner diameter $d_2$ is 8.0 mm. Therefore, the ratio of an outside diameter of $d_1$ to the inner diameter is 2.75 and, thus, the annular size $\Delta$ is 7 mm. This small annular size is one of the advantages of the present invention. Insert molding plastic housing 112 around the stator 120 further reduces the overall size of the aperture/shutter system since the components do not need to be molded as discreet parts. Since some of the rotor components are eliminated, this results in a very compact aperture/shutter system. In addition, because the rear wall 112c of the aperture/shutter housing 112 is very thin (about 0.4 mm to about 0.9 mm), the lens elements can be located very close to the aperture stop. For manufacturing reasons, it is preferred that the wall thickness be 0.6 to 0.8 mm. In this embodiment it is about 0.7 mm. Although the housing walls are very thin, the rear wall 112c is supported by the stator 120 and, because of this support, it retains its flatness and does not warp, providing proper location for the posts 112b and providing a pivot support for the blades 110.

The stator 120 does not have to be formed integrally with the housing 112, and thus does not have to be insert molded into the housing 112. Instead, the stator 120 can be assembled within the housing 112 using precision assembly. This is shown in a second embodiment of the present invention, depicted in FIGS. 5A and 5B (these figures illustrate different covers 114c). However, although such an aperture/shutter system provides some of the size advantages mentioned above, the assembly of housing 112 around the stator 120 has to be done to tight tolerances and this can be difficult and expensive. Also, an additional housing plate with the support posts 112b (for supporting cam pivot points) would be required. This additional housing plate has to be relatively thick (along the optical axis) in order to provide a rigid support for the posts 112b and to prevent warping. Furthermore, if the aperture/shutter housing is manufactured separately and the stator 120 is then assembled inside the aperture/shutter housing, the walls of the aperture/shutter housing will need to be thicker, in order to provide the required rigidity to the aperture/shutter housing 112, making the aperture/shutter housing 112 larger.

The stepper motor 113 also includes a magnetic rotor 130 (see FIG. 2). The rotor 130 is manufactured as a single, integral part made of the same magnetic material. That is, it is not made of several parts that have been assembled together. The motion of the magnetic rotor 130 is activated by the magnetic fields provided by the stator 120. The rotor 130 of the first embodiment is similar to that of the second embodiment and, is in a form of a ring that has an outer cylindrical surface 130a and an inner cylindrical surface 130b defining a hollow central portion 130c. This hollow central portion 130c provides light access to the imaging area 115. The rotor 130 and the hollow section 130c are centered around the optical axis, and thus are symmetric relative to the optical axis. The rotor 130 is coupled directly (i.e., without any intervening parts, for example, parts made of other materials) to the shutter blades 110 by a plurality of positioning features integrally formed thereon, for example, rotor posts 131. These posts 131 are slidably positioned inside the slots 110a of the shutter blades 110. Thus, there are no intermediate parts, such as a pinion gear and a ring with a sector gear for coupling the rotor to the shutter blades, nor is there a ball barring, such as the one disclosed in U.S. Pat. No. 4,005,448 for positioning the rotor relative to the stator. As the rotor 130 rotates, the blades 110 will pivot about the posts 112b formed on the rear side of the rear wall 112c of the molded housing 112. When the rotor 130 rotates, the blades 110 move as a direct consequence of that rotation. Thus, there is no need for the pinion gear and the ring common to the prior art. Because the rotor 130 is an integral part, and because it couples directly to the shutter blades 110, there is no need for a careful alignment of different parts of the rotor assembly with respect to one another and with respect to the slots 110a of the shutter blades 110. That is, because there are fewer interfaces among the different parts, there are fewer tolerances that may add together. This decreases the cost of the aperture/shutter system and improves it accuracy.

The rotor 130 is magnetic and is made of a moldable material that is capable of being magnetized, for example, an isotropic neodymium-iron-boron, an isotropic samarium-cobalt, praseodymium-iron-boron, or other rear earth magnetic material. After the rotor 130 is molded it is magnetized to form a plurality of magnetic poles thereon. The larger the number of poles, the more aperture settings are feasible. An imaging system with multiple aperture settings (corresponding to multiple F-numbers) require that a motor has at lest that number of steps plus two more steps in order to completely close the aperture opening. Thus, if seven aperture sizes are required (corresponding to seven F-number values) of the lens system, then a minimum of nine steps are required of the motor. These steps correspond to the seven aperture settings and two steps for the home position (to completely close the shutter blades). However, it is preferred that the number of magnetic poles be 20 or more, and even more preferred that it be at least 26 and most preferable over 30 poles. It is difficult to produce more than 50 poles in the rotor of this size because of the high coercivity of the material forming the rotor. However, a rotor with a larger circumference may have a larger number of poles. The closer the poles are with respect to one another (around the outer circumference of the rotor) the less rotation is required of the rotor and the faster is the shutter response to open and close control sequences. In this embodiment the lens system has seven aperture sizes and the outer cylindrical surface 130a of the magnetic rotor 130 has thirty six equidistant magnetic poles (18 north poles and 18 south poles) facing the stator. The north poles are sandwiched between the south poles and the south poles are sandwiched between the north poles of the rotor. The diameter of an inner cylindrical surface 130b of the rotor 130 is 13.58 mm and diameter of the outer cylindrical surface 130a of the rotor 130 is about 16.3 mm. The circumference of the outer cylindrical surface 130a is 51.2 mm. It is preferred that the pole density $D_p$ of the rotor (defined as the ratio of the circumference of the outer cylindrical surface 130a to the number of magnetic poles) be less than 2. It is more preferable that the pole density be $1 \leq D_p \leq 1.7$. It is even more preferable that the pole density be $1.1 \leq D_p \leq 1.7$. It is most preferable that the pole density be $1.28 \leq D_p \leq 1.7$. In this embodiment, the pole density $D_p=51.2/36=1.4$. That is, the centers of the adjacent magnetic poles are approximately 1.4 millimeter apart.

In this embodiment, in order to reduce the mass of the rotor, the rotor 130 is positioned inside the stator 120. However, the position of the rotor and the stator may be reversed—i.e., the stator may also be positioned inside the rotor. In order to keep the motor compact it is preferable that the rotor be as small as possible while its hollow section 130c be as large as possible (in order to increase the F-number of the lens system). Thus, it is preferred that the thickness of the rotor be about 1.5 mm or less, and that its length (without the posts) be less than 5 mm. The small size of the rotor makes it light and easy to turn, providing a higher torque. However, if the rotor is too small, it does not generate enough magnetic field and that makes it difficult to rotate. Therefore it is preferred that (i) the rotor thickness be about 0.5 mm to about 1.5 mm and (ii) the rotor length be 2.5 to 5 mm, and preferably 3 to 4 mm. In this embodiment the thickness of the rotor 130 is about 1 mm and the length of the rotor is about 3.5 mm long. The rotor posts are molded together with the rotor and are integral therewith. These posts are approximately 2 mm long and their diameter is about 1 mm.

The rotor 130 is kept in proper position with the internal central hub 112a, hemispherical location pads 114a and the cover 114c. Although the rotor 130 rotates, the hub 112a does not. The hub surface engages the inner cylindrical surface 130b of the rotor 112 and rotably supports the rotor 112. Because there is no rotational inertia associated with the movement of the hub, the motor requires less power and the torque generated by the motor is greater and is more uniform than the torque generated by the prior art motors such as the one disclosed in U.S. Pat. No. 4,005,448. The rotor 130 also includes a horizontally extending key 132. The slot 114b of the molded housing 112 is used to engage the key tab 132 of the rotor 130 to constrain its range of rotation from aperture closed position to full open position. Features molded into the aperture/shutter housing 112 include the internal central hub 112a which supports the rotor 130 and which determines the position of the inside diameter of the rotor 130, and a slot 114b which holds a key tab 132 (from the rotor 130) inserted into it. This slot 114b limits the travel of the rotor in both directions. The total amount of rotation for the rotor 130 of this embodiment is ±25 degrees. The full rotation of the rotor 130 is performed in ten 5 degree steps.

The hub 112a of the aperture/shutter housing 112 determines the position of the rotor 130, and if the position of the stator 120 deviates too much from the specified position (due to build up of manufacturing and assembly tolerances), the rotor 130 may contact the stator 120, causing the motor 113 to stall. Thus, in order to improve the accuracy of the features in the aperture/shutter housing 112 that position the rotor 130 with respect to the stator 120, it is preferred to integrally form the aperture/shutter housing 112 and a stator 120 rather than to assemble them together. This can be accomplished, for example, by insert molding the aperture/shutter housing 112 around the two stator assemblies 120a, 120b as described in the first embodiment. This eliminates the positional variation exhibited by the prior art aperture/shutter assemblies due to assembly of separate parts of the aperture/shutter housing 112 and the rotor 130 and stator 120 with respect to one another. Because insert molding the stator 120 inside the aperture/shutter housing 112 (as it was done in the first embodiment) allows additional precision in positioning of the rotor 130 with respect to the stator 120, this in turn allows the gap $d_3$ (FIG. 2) between the stator 120 and the rotor 130 to be reduced. This gap $d_3$ is formed as follows. The outer cylindrical surface 130a of the rotor 130 is of a smaller diameter than the inside surface 125a of the inner cylindrical wall 125 of the stator 120. The inner cylindrical surface 130b of the rotor 130 sits on the cylindrical hub 112a of the aperture/shutter housing 112. Therefore, an annular gap $d_3$ is formed between the inside surface 125a of the inner cylindrical wall 125 of the stator 120 and the outer cylindrical surface 130a of the rotor 130. The size of the gap $d_3$ is one of the primary factors in determining the available torque of the motor. Therefore, as the gap $d_3$ between the stator 120 and the rotor 130 is reduced, the torque is increased and this results in faster acceleration of assembly and therefore faster shutter time. The reduction in gap distance also results in less need for power to drive the motor (i.e., lower voltage or less current) in order to achieve the same performance (rotational speed of the rotor).

Figure 5A:
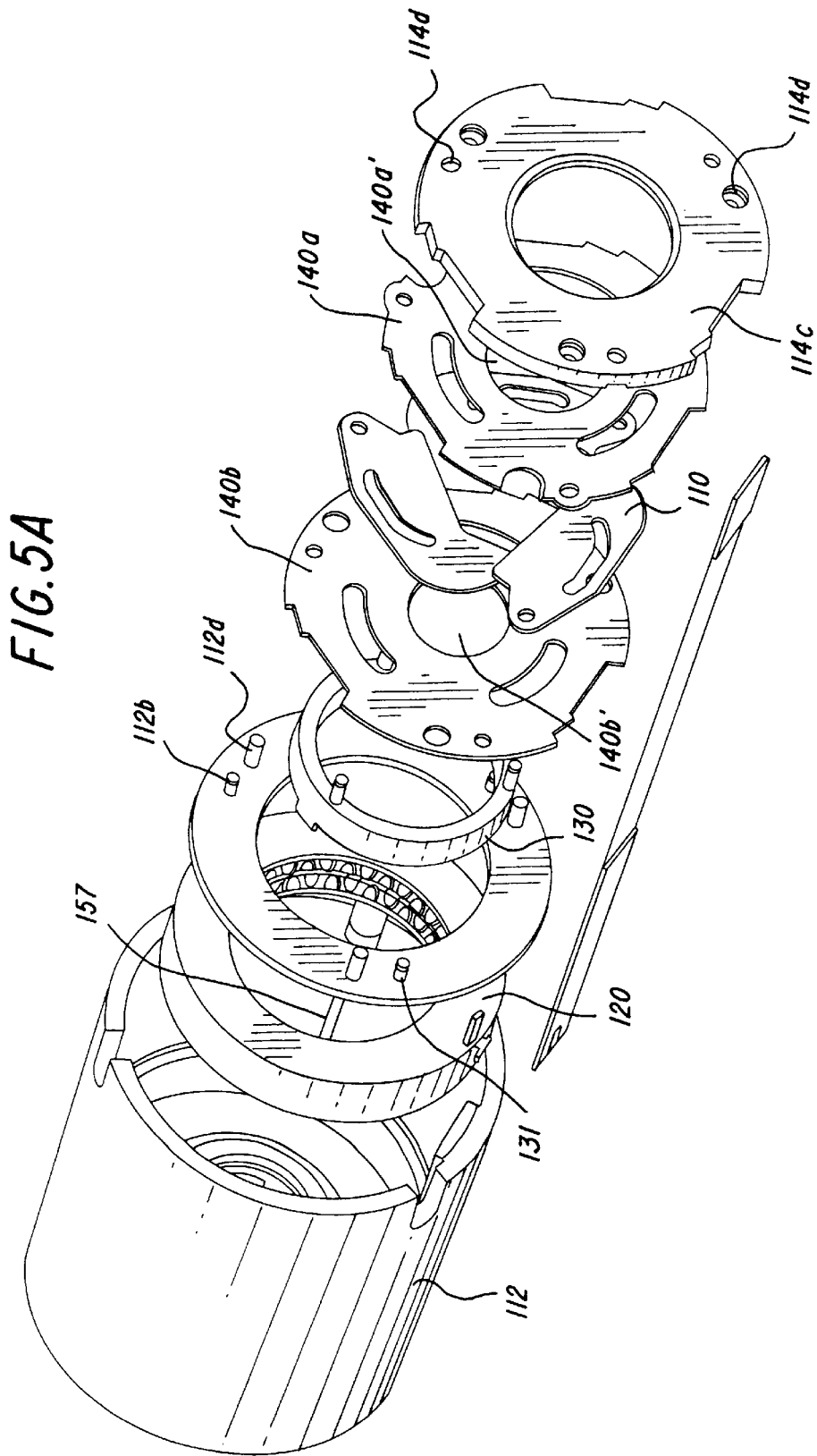
FIG. 5A is an exploded view of a stepper motor housing, a stator that is being assembled into this housing, a rotor, shutter blades, separators and a cover.

The aperture stop/shutter shown in FIGS. 2 and 5A includes at least three shutter blades 110, which also function as the aperture setting blades. It is noted that either a larger or a smaller number of shutter blades may also be used. As discussed above, each of the shutter blades 110 includes a cam slot 110a for engaging a corresponding feature, such as posts 131 situated on the rotor 130. The shape of these cam slots 110a determines the size of the apertures. The shutter blades 110 also include a plurality of holes 110b for engaging the posts 112b located on the rear wall 112c of the aperture/shutter housing 112 (FIG. 3), or for engaging posts 112B of a rear plate 112c' (FIG. 5A). In the first embodiment, the posts 112b are molded with the aperture/shutter housing 112 and are integral with the aperture/shutter housing. The positioning precision of these posts 112b are an important factor that effects the accuracy of the aperture opening. Since posts 112b are formed integrally with the aperture/shutter housing, their position is always accurate. Thus, molding the posts 112b with the rest of the aperture/shutter housing increases the accuracy of the aperture/shutter system 100 and eliminates the expense of complex alignment during assembly.

Two separators 140a and 140b provide a smooth surface for the shutter blades 110 to slide on. An upper separator (140a) is used to hold the shutter blades 110 in a plane and to reduce the oscillating movement of the shutter blades 110 and the rotor 130 when motor 113 is stopped at the desired aperture. The lower separator 140b is used for setting the maximum aperture opening and has a smaller central hole 140b' than the hole 140a' of the housing or of upper separator 140a. The cover 114c is used to hold the rotor 130, shutter blades 110, lower separator 140a, and upper separator 140b in place. This cover 114c attaches to the housing 112 with screws, heat stake posts 112d or a snap (not shown) (See FIGS. 6, 7, and 8.) The cover 114c includes a plurality of features, for example, holes 114d (see, for example, FIGS. 2, 5A, 5B) that engage complimentary features, such as heat stake posts 112d formed on the rear wall 112c of the housing 112. The cover 114c also functions as a lens mount and, therefore, may include at least one integrally molded lens seat 114c'. This is shown in FIG. 5B. As mentioned earlier, the stepper motor 113 comprises a doughnut like housing 112 encasing two stator assemblies 120a, 120b and a rotor 130, at least partially encased in the housing 112. The molded aperture/shutter housing 112 also includes the heat stake posts 112d or holes 112d' (see FIG. 4) for the screws in order to allow attachment of the cover 114c to the housing 112. This configuration also results in an aperture/shutter system with an annular shape of a smaller size and a greater aperture opening (which is especially suitable for zoom lens systems) and in fewer parts to assemble, thereby reducing the cost of the aperture/shutter assembly.

Figure 8:
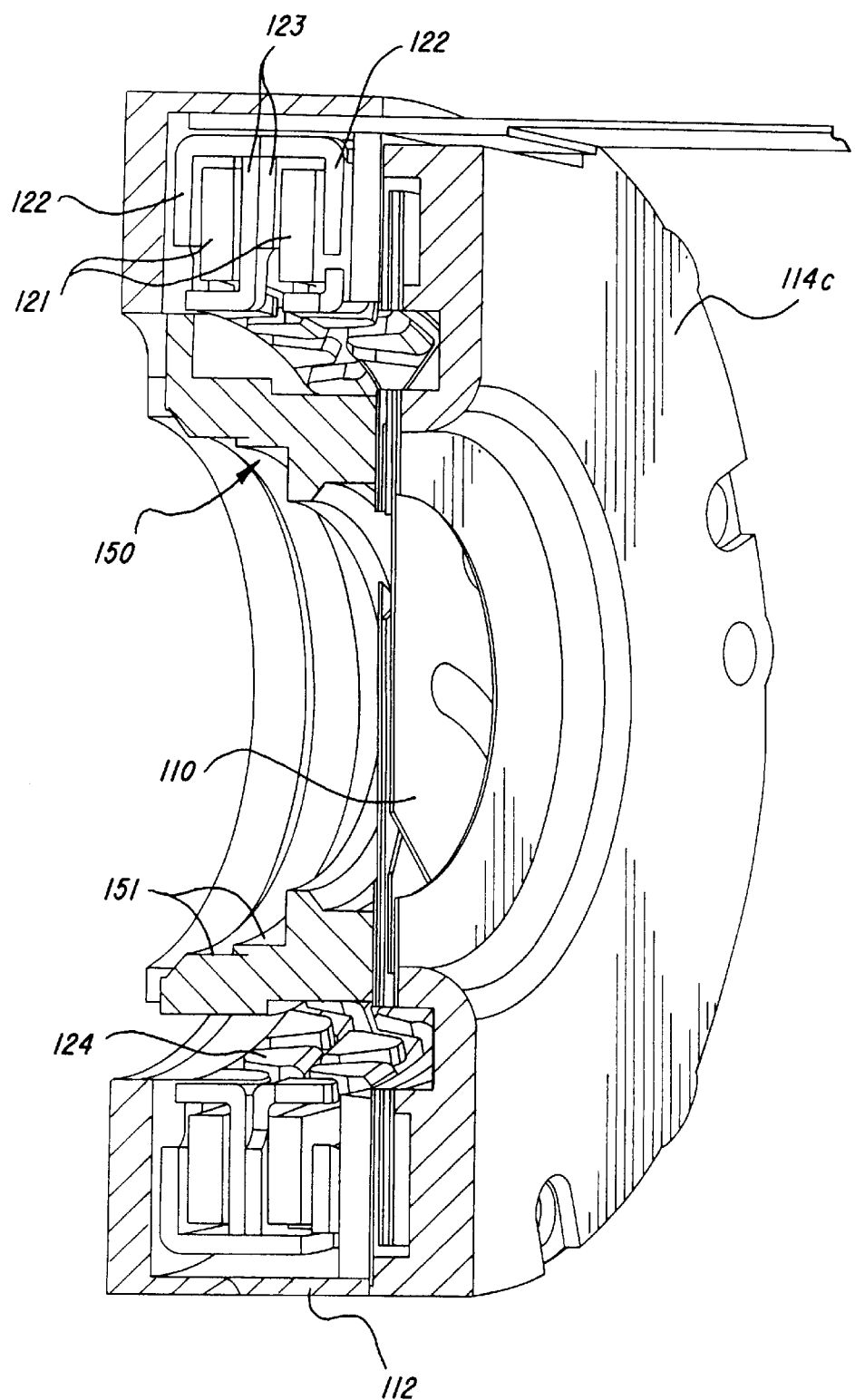
FIG. 8 is a cut-out view of the assembly of FIGS. 6 and 7 but without the rotor.
Figure 9:
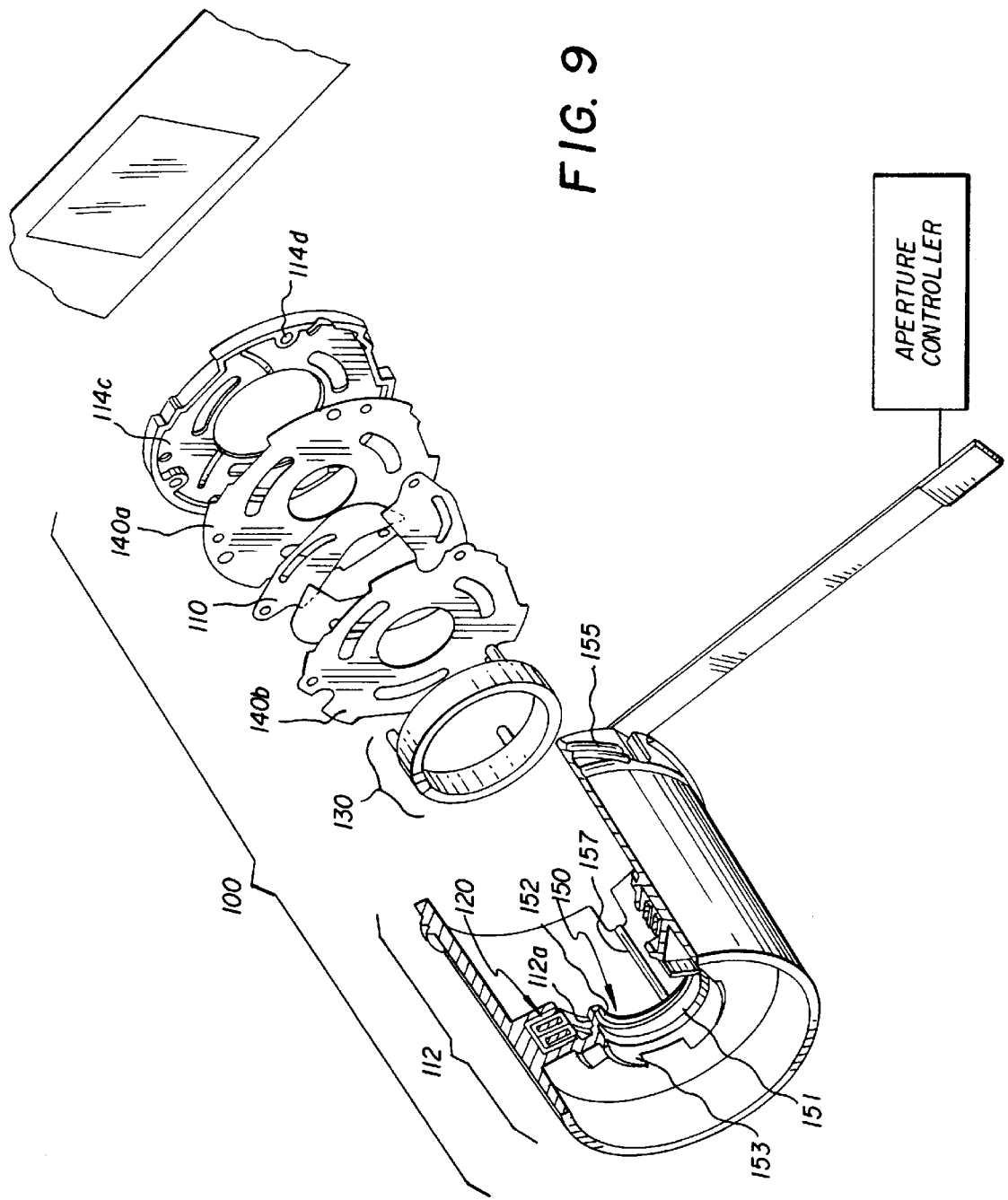
FIG. 9 is an exploded view of a directly coupled stepper motor aperture/shutter system of another embodiment of the present invention.
Figure 10:
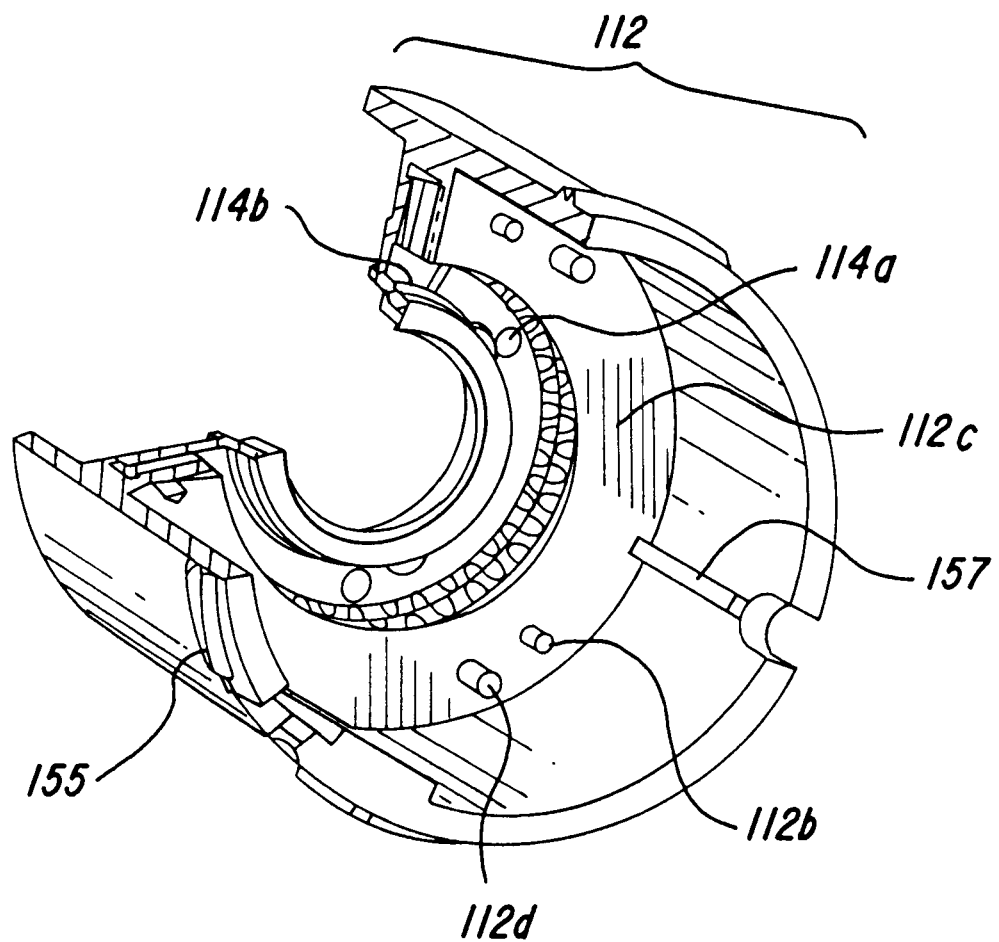
FIG. 10 is a perspective view of the stepper motor housing and stator assembly shown in FIG. 9.

The fourth embodiment of the aperture/shutter system of the present invention is similar to the first embodiment, but the housing 112 also serves as a lens barrel. This embodiment is shown in FIGS. 8, 9 and 10. More specifically, the shutter/aperture system 100 can also include one or more lens mounts 150 with lens seats 151 for holding one or more lens elements. The lens mounts, including the lens seats 151, are formed integrally with the housing 112 and the stator 120 for example, by plastic molding or casting. Thus, according to this embodiment, the aperture/shutter system 100 incorporates the integral housing 112, the rotor 130, the shutter components and an integrally formed, for example by plastic molding, lens seat 151 and the stator 120. More specifically, the metal stator 120 is assembled first and the aperture/shutter housing 112 with lens seats is molded around the stator 120. With reference to FIG. 9, the lens mounts 150 may include a lens element locating and retaining feature, such as the ring 152 and a lens seat 151 for one or more lens elements. In addition, the housing 112 may also include an integral axially extended ring 153 that can be heated and pressed against a lens element situated adjacent to it, forming a heat seal and retaining the lens element(s) in place. A separate retaining ring may be used instead of using the ring 153 to keep the lens element in place.

The embodiment of the aperture/shutter housing 112 with the lens mounts 150 may also have features that could mate to a lens barrel. For example, FIGS. 9 and 10 show that the housing 112 has a helictical thread 155 formed on its external surface. The helictical thread 155 interacts with a complimentary thread of a lens barrel or a sleeve, allowing the housing 112 to be assembled inside the lens barrel or inside the sleeve. Furthermore, another, smaller lens barrel may be slidably positioned inside the housing 112. This smaller lens barrel engages a rib 157 of the housing 112, so that the smaller barrel can slide along the rib 157 without rotating relative to the housing 112. Other features for engaging lens barrels or other mechanisms may be also molded on the housing 112.

Figure 1:
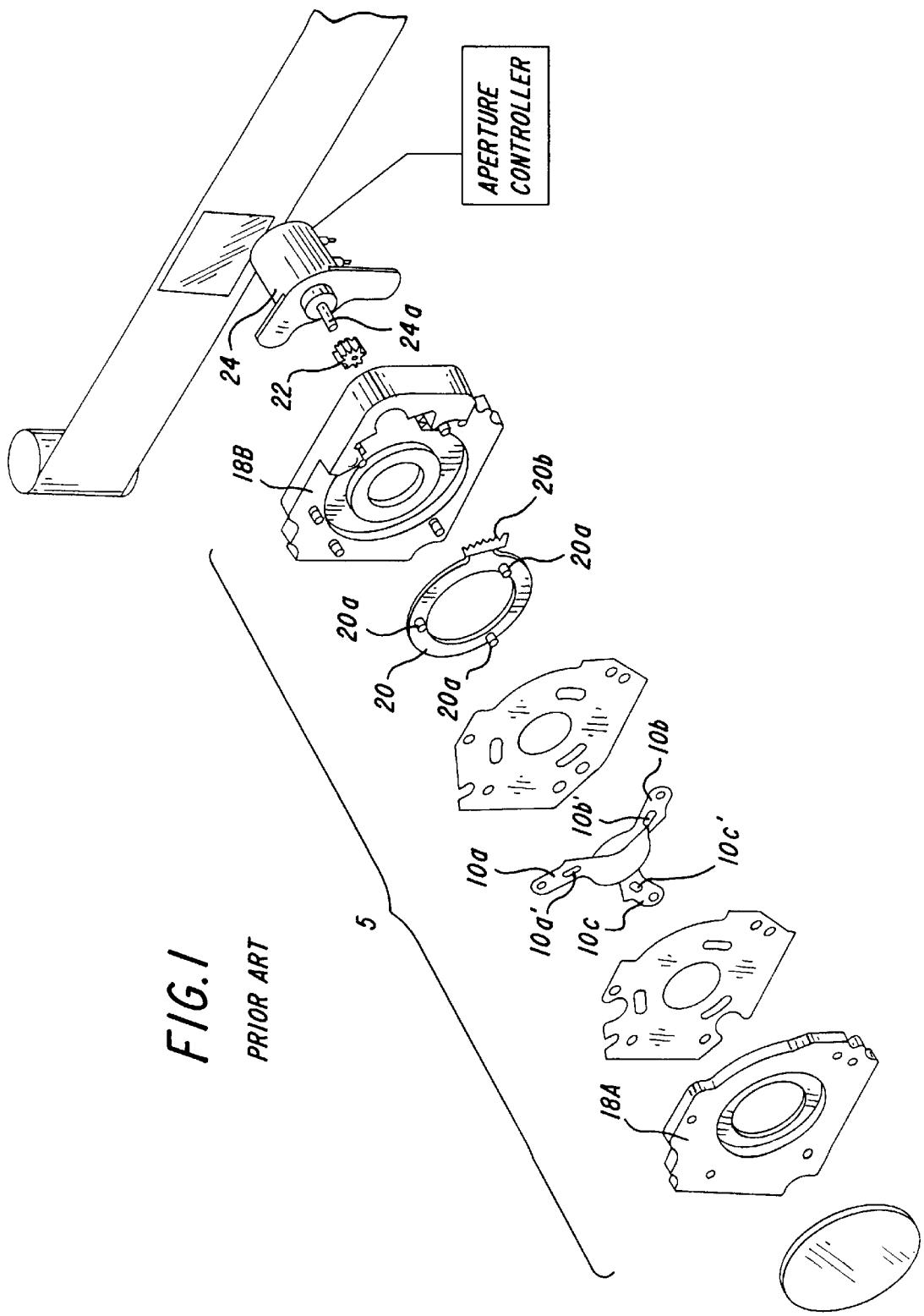
FIG. 1 illustrates a prior art aperture/shutter system.

FIG. 1 illustrates a zoom lens assembly of the fifth embodiment of the present invention. This zoom lens assembly comprises an aperture/shutter assembly (with or without lens elements situated in its hollow portion) and at least one lens barrel mated to the aperture/shutter assembly. A zoom lens assembly includes a plurality of lens groups, at least one of which is movable in order to provide a zoom lens system with the desired zoom ratio.

Figure 11:
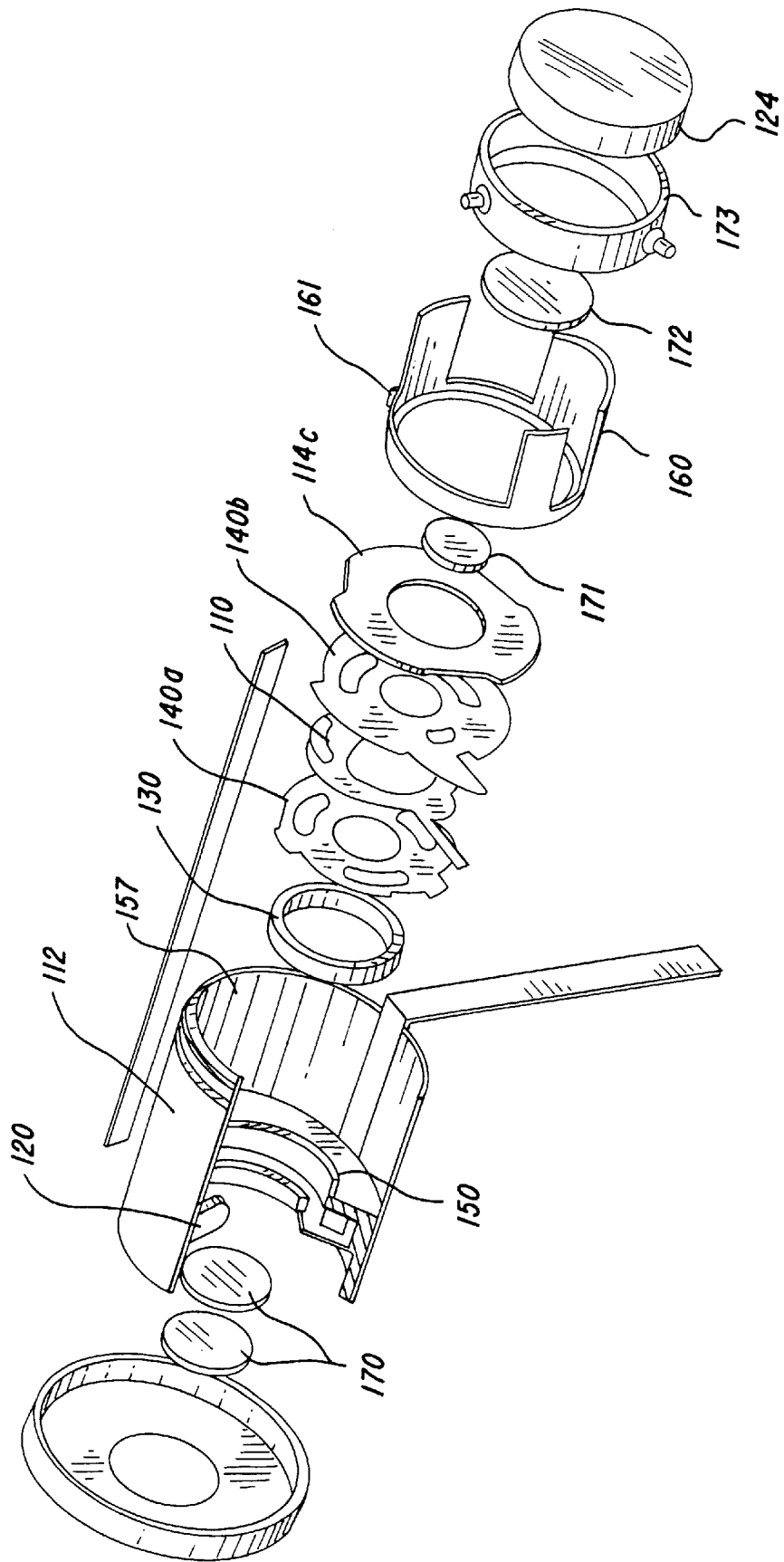
FIG. 11 is an exploded view a zoom lens assembly.

More specifically, FIG. 11 shows a smaller lens barrel 160 with positioning features 161 for engaging a plurality of ribs 157 of an aperture/shutter system 100. These ribs 157 prevent the rotation of the smaller lens barrel 160 within the aperture shutter housing 112. This lens barrel 160 fits within the aperture shutter housing 112. The aperture/shutter system 100 is similar to that of the third embodiment. It includes an integral housing 112, with a stator 120 and lens mounts which include lens seats 151 for holding two lens elements 170. FIG. 11 also shows a rotor 130, and a plurality of shutter blades 110 sandwiched between two separators 140a and 140b. The whole assembly fits inside the housing 112 and is enclosed inside the housing 112 by a rear cover 114c. The small lens barrel 160 provides support for lens elements 171, 172 and is slidably fitted inside the housing 112. In addition, a rear lens barrel 173 supports a lens element 174 and also fits inside the housing 112.

The following are some of the advantages of the aperture/shutter system of the present invention:

The aperture/shutter system of the present has a small size, large central opening and fewer parts to assemble, thereby reducing the cost of the aperture/shutter system.

Zoom lens systems require many different aperture settings, because as zoom lens system changes its focal length (from wide to telephoto, for example) the aperture size changes. The larger the zoom ratio, the greater is the number of different aperture settings required. Thus, this invention is especially suitable to zoom lens systems and is even more suitable to zoom lens systems with large zoom ratio (2× or higher) because it offers multiple aperture settings in a very small package with minimum number of parts.

It is also an advantage of the aperture/shutter system this invention that it is (i) compact and (ii) provides a large aperture opening, thus enabling a lens system to have a faster F-number. This results in greater flash distance, higher image quality, greater light gathering capability and, if used in a zoom lens system, a longer focal length in telephoto mode.

The term "aperture/shutter system" defines a device that can be operated either as (i) a light controlling aperture only (in which case a camera may or may not require an additional shutter activated by an additional motor or other means; or (ii) a shutter having only an open and closed position; or (iii) a combination aperture shutter system that operates both as a light controlling aperture and a shutter.

The invention has been described in detail with particular reference to certain preferred embodiments thereof, but it will be understood that variations and modifications can be effected within the spirit and scope of the invention.

PARTS LIST 100 aperture/shutter system
110 blades
110a slot
110b hole
112 aperture/shutter housing
112a internal central hub
112b post
112c rear wall
112d stake posts
112d' holes
113 stepper motor
114 inner wall
114a hemispherical location pads
114b slot
114c rear cover
114d holes
115 imaging area
116 film
120 stator
120a, 120b stator assemblies
121 coil
122, 123 metal parts of the stator assembly
124 interleaved teeth
125 cylindrical wall
125a inside surface
130 rotor
130a outer cylindrical surface
130b inner cylindrical surface
130c hollow central portion
131 post
132 keytab
140a upper separator
140a' upper separator central hole
140b lower separator
140b' lower separator central hole
150 lens mount 151 lens seat
152 ring
153 extended ring
155 helictical thread
157 rib
160 small lens barrel
171, 172 lens elements
173 rear lens cell
174 rear lens element

What is claimed is:

1. An aperture/shutter system defining an optical path, said aperture/shut system comprising:
   a shutter mechanism operable at a first state to selectively block light along said optical path and a second state to allow light along said optical path; and
   a motor including a stator and an annular rotor, said rotor being rotably supported within said stator by a support that is (i) stationary with respect to said stator and (ii) engages an inner surface of said rotor, said rotor being coupled to said shutter mechanism to move said shutter mechanism between said first state and said second state.

2. An aperture/shutter system according to claim 1, wherein said rotor has a central opening therethrough which is aligned with said optical path such that light passes through said central opening and through said shutter mechanism at least when said shutter mechanism is in said second state.

3. An aperture/shutter system according to claim 1, wherein said motor has a housing integral with said stator and said housing provides said support for said rotor.

4. An aperture/shutter system according to claim 3, wherein said rotor has a central opening there through which is aligned with said optical path such that light passes through said central opening and through said shutter mechanism at least when said shutter mechanism is in said second state.

5. An aperture/shutter system according to claim 4, wherein said housing has at least one lens seat supporting at least one lens element in said optical path.

6. An aperture/shutter system according to claim 4, further comprising a cover, said cover including at least one lens seat.

7. An aperture/shutter system comprising:
   a shutter blade; and
   a motor including (i) a housing; (ii) a stator, and (iii) an annular rotor being axially aligned with said stator along an optical axis, wherein said housing is molded around said stator and is integral with said stator, and said housing includes a hub supporting said rotor, said stator in combination with said rotor causing rotation of said blade.

8. An aperture/shutter system according to claim 7, wherein
   said rotor (i) is at least partially located inside said stator; (ii) has an inner cylindrical surface defining a central opening symmetric about said optical axis; and
   said hub is located within said central opening and engages said inner cylindrical surface.

9. A motor comprising:
   a stator and an annular rotor, said rotor being rotably supported within said stator by a support that is (i) stationary with respect to said stator and (ii) engages an inner surface of said rotor.

10. A motor comprising:
    a stator and an annular rotor arranged inside said stator, said rotor (i) having an outer surface facing said stator and an inner surface and, (ii) is being rotably supported within said stator by a support that is stationary with respect to said stator and that engages said inner surface of said rotor.

11. A motor according to claim 10, wherein said outer and said inner surfaces of said rotor and said support are cylindrical.

12. A motor according to claim 11, further comprising a housing encasing said stator, wherein said housing includes a hub providing said support.

13. An annular stepper motor comprising:
    a stator;
    a motor housing molded around said stator and being integral therewith, said housing having a central hub; and
    a magnetic rotor having an inner surface that is rotably supported by said hub.

14. A motor according to claim 13, wherein said housing has at least one lens seat formed therein.

15. A motor according to claim 13, wherein said housing has plastic walls with thickness of 0.4–0.9 mm.

16. A motor according to claim 13, wherein said housing includes integral features capable of engaging a lens barrel.

17. A motor according to claim 16, wherein said integral features are helicoidal threads.

18. A motor according to claim 17, wherein said threads are helicoidal and are located on an external surface of said housing.

19. A motor according to claim 17, wherein said threads are helicoidal and are located on inside surface of said housing.

20. An aperture shutter system defining an optical path, said aperture/shutter system comprising:
    a shutter mechanism operable at a first state to selectively block light along said optical path and a second state to allow light along said optical path; and
    an annular stepper motor including (i) a stator, (ii) a motor housing molded around said stator and being integral therewith, said housing having a central hub, and (iii) a magnetic rotor having an inner surface that is rotably supported by said hub; said rotor being coupled to said shutter mechanism to move said shutter mechanism between said first state and said second state.

21. An imaging system comprising:
    plurality of lens elements defining an optical axis;
    a shutter mechanism including a plurality of shutter blades; and
    a motor including a stator and an annular magnetic rotor arranged inside said stator, said rotor being rotably supported within such stator by a support that engages an inner surface of said rotor and is stationary with respect to said stator, said rotor being axially aligned with said stator along said optical axis, said stator in combination with said rotor causing rotation of said blades.

22. An imaging system according to claim 21, wherein said motor comprises a housing molded around at least a part of said stator and said housing provides said support for said rotor.

23. An imaging system according to claim 21, wherein said motor further comprises a cover, said cover including at least one lens seat supporting at least one of said plurality of lens elements.

24. An imaging system according to claim 22, wherein said cover is connected to said housing.

25. An imaging system according to claim 21, wherein said plurality of lens elements comprise at least two moving groups which, in combination, provide at least 2× zoom ratio; and said motor is an annular motor defined by an outside diameter $d_1$ and an inner diameter $d_2$ such that $2.5<d_1/d_2<3.4$.

26. An imaging system according to claim 25, wherein said housing has plastic walls with thickness of 0.4 mm to 0.9 mm.

27. An imaging system according to claim 21, wherein said housing has plastic walls with thickness of 0.4 mm to 0.9 mm.

28. An imaging system according to claim 21, wherein
   (i) said plurality of lens elements comprise at least two moving groups and, in combination provide at least 2× zoom ratio,
   (ii) at least one of said lens groups is enclosed in a lens barrel with at least one positioning feature and said housing comprises at least one complimentary feature for engaging said positioning feature of said lens barrel.

29. An imaging system according to claim 28, wherein said motor has housing molded around at least a part of said stator and said housing supports at least one of said plurality of lens elements.

30. An imaging system according to claim 28, wherein said complimentary feature is internal to said housing and said lens barrel at least partially fits inside said housing.

31. An imaging system according to claim 29, wherein said complimentary feature is a rib.

32. An imaging system according to claim 21, wherein said shutter mechanism is operable at a first state to selectively block light along an optical path centered on said optical axis and a second state to allow light along said optical path; and said rotor being directly coupled to said shutter mechanism to move said shutter mechanism between said first state and said second state.

* * * * *